United States Patent [19]

Goldie et al.

[11] Patent Number: 4,474,607

[45] Date of Patent: Oct. 2, 1984

[54] METHOD OF INHIBITING CORROSION USING CATIONS

[75] Inventors: Brian P. F. Goldie, North Cheam; John J. McCarroll, Camberley, both of England

[73] Assignee: The British Petroleum Company p.l.c., London, England

[21] Appl. No.: 474,208

[22] Filed: Mar. 10, 1983

[30] Foreign Application Priority Data

Mar. 19, 1982 [GB] United Kingdom ................. 8208107

[51] Int. Cl.$^3$ ............................................... C04B 9/02
[52] U.S. Cl. .............................. 106/14.39; 106/14.44; 252/389 R; 524/428; 524/403; 524/401
[58] Field of Search ................. 252/389.1; 106/14.39, 106/14.44, 299, 304, 14.34; 524/80, 401, 403, 524/428; 423/DIG. 8, DIG. 14

[56] References Cited

U.S. PATENT DOCUMENTS

| | | | |
|---|---|---|---|
| 2,913,419 | 11/1959 | Alexander | 252/313 S |
| 3,899,624 | 8/1975 | Sutherland | 428/327 |
| 4,210,575 | 7/1980 | Drake | 524/407 |
| 4,419,137 | 12/1983 | Cayless et al. | 106/14.39 |

FOREIGN PATENT DOCUMENTS

| | | |
|---|---|---|
| 0046057 | 2/1982 | European Pat. Off. . |
| 1503153 | 3/1978 | United Kingdom . |
| 2071070A | 9/1981 | United Kingdom . |

*Primary Examiner*—Josephine L. Barr
*Attorney, Agent, or Firm*—Morgan, Finnegan, Pine, Foley & Lee

[57] ABSTRACT

A corrosion inhibitor comprises particles of an inorganic oxide having cations of yttrium or cations of one or more metals of the lanthanide group chemically bound to the particles by ion-exchange. The cations are released by ion-exchange with other cations and not by the water solubility of the corrosion inhibitor.

The corrosion inhibiting particles may be prepared by contacting particles of the inorganic oxide with an aqueous solution containing the required cations. Alternatively, the particles of the inorganic oxide may be contacted with an aqueous solution of an alkali metal so that alkali metal ions are exchanged onto the surface of the oxide and then contacting the alkali metal exchanged oxide with a solution of the required cations so that the required cations replace the alkali metal cations.

The corrosion inhibiting particles may be incorporated into protective coatings e.g. paints based on epoxy resins, alkyd resins, vinyl resins or chlorinated rubbers in amounts up to 80% wt. based on the dry film weight of the coating.

17 Claims, No Drawings

METHOD OF INHIBITING CORROSION USING CATIONS

The present invention relates to corrosion inhibitors suitable for incorporation into protective coatings, e.g. paints, to methods of producing the corrosion inhibitors and to coatings containing them.

It is known that certain cations, e.g. calcium and zinc cations have corrosion inhibiting properties and that compounds containing them can be included in protective coatings. The compounds are usually in the form of sparingly water-soluble salts. The coatings themselves have a limited permeability to water and it is believed that the mechanism of corrosion inhibition involves the gradual dissolving of the compounds in water releasing the cations as the active inhibitors. For such systems to be effective over a long period the solubility of the compound is particularly important. If the compound is too soluble, blistering of the coating may occur and the compound will be rapidly depleted; if it is insufficiently soluble the compound will be ineffective.

The present invention is concerned with corrosion inhibitors which depend for their effectiveness on ion-exchange rather than solubility.

The specification of published European patent application No. 0 046 057 describes and claims a corrosion inhibitor comprising particles of an inorganic oxide which is silica or alumina having corrosion inhibiting cations chemically bound to the particles by ion-exchange. The cations specifically disclosed are calcium, zinc, cobalt, lead, strontium, lithium, barium and magnesium.

It has now been found that surprisingly good corrosion protection may be obtained using inorganic oxide particles having certain other cations, chemically bound to the particles.

Thus, according to the present invention a corrosion inhibitor comprises particles of an inorganic oxide having cations chemically bound to the particles by ion-exchange which cations are released by further ion-exchange, characterised in that the cations are cations of Yttrium or cations of one or more metals of the Lanthanide group which metals have atomic numbers from 57 to 71 inclusive. The preferred cations are yttrium, lanthanum and cerium. Mixtures of the lanthanide cations derived from natural ores are also suitable.

The preferred inorganic oxide is silica. Other oxides which may be suitable include alumina, zirconia, iron oxides ($Fe_2O_3$ and $Fe_3O_4$) and tin oxide. Mixed meal oxides may also be suitable as may naturally occurring clays such as kaolinite.

As is well known, particles of silica, alumina and other inorganic oxides may be prepared which have a proportion of hydroxyl groups on their surface, e.g. the so-called activated aluminas of commerce used, inter alia, as packing for chromatographic columns and silicas used for drying.

It has been found that the protons of the hydroxyl groups can be replaced by contacting the inorganic oxide with a solution containing the required cations. To carry out the ion exchange the inorganic oxide may be contacted with an aqueous solution of a soluble salt (e.g. nitrate) of the required cation and the pH of the mixture adjusted as necessary, by the addition of a suitable, soluble, basic salt such as, for example alkali metal salts. A particularly suitable basic salt is sodium hydroxide. The preferential absorption of the required cation is assisted by the use of a relatively high concentration of the soluble salt of the cation. Typically the concentration of the solution is about one mole. The pH of the mixture may be monitored by a suitable pH meter. The pH needs to be high enough to remove the protons but there is an upper limit determined by the pH level at which the competing reaction i.e. precipitation of the cation hydroxide or hydrous oxide, becomes significant. The minimum pH is determined by the affinity of the exchanging cation for the inorganic oxide. The maximum pH level is also dependent on the cation. Typically, the ion exchange reaction will start to occur at a pH in the range 3.5 to 5.5 and the pH should not be allowed to rise above 7.

The ion-exchange reaction is an equilibrium reaction which can conveniently be carried out at ambient temperature (i.e. around 20° C.). However, temperatures greater than or less than ambient may be used. An increase in temperature reduces the time to reach equilibrium and a decrease in temperature increases the time to reach equilibrium. The concentration of the ions affects the position of the equilibrium. A high concentration of ions forces the reaction further to completion.

The uptake of ions can be followed by observing the fall of pH over a period of time following the addition of the base. When the pH no longer falls after the addition of the base then exchange is complete and the inorganic oxide can be milled, if necessary, washed and dried under vacuum. Uptake of cations in the oxide can be measured by XRF spectroscopy.

An alternative method of preparing the corrosion inhibiting particles according to the invention comprises contacting an inorganic oxide having surface hydroxyl groups with an aqueous solution of an alkali metal salt at a pH sufficiently above 7 for the protons of the hydroxyl groups to be replaced by alkali metal cations and thereafter contacting the alkali metal exchanged inorganic oxide with a solution containing the required yttrium cations or cations of one or more of the lanthanides so that the alkali metal cations are replaced by the required cations. The amount of alkali metal cations remaining in the final product will depend on the relative affinities of the exchanging ions for the oxide surface and also on the concentration of the solution containing the required cations. Typically the concentration of the solution is about one molar. This method has the advantage that the contamination of the product with the insoluble hydroxide of the required cation may be reduced. Sodium salts, such as sodium hydroxide are suitable alkali metal salts for use in this method.

Preferably the inorganic oxide has a BET surface area greater than 100 $m^2/g$ and more preferably greater than 250 $m^2/g$. Most preferably the BET surface area is greater than 500 $m^2/g$. As indicated subsequently the particles should be of relatively small size when incorporated into protective coatings. Thus, particles having a small particle size may be ion-exchanged and incorporated into the coating. Alternatively, it has been found that larger size particles can be ion-exchanged and then subsequently milled to a smaller size without adverse effect. The use of a larger particle size does not significantly reduce the uptake of ions and the subsequent milling does not destroy the chemical bond.

Suitable silicas are as follows:

|  | Particle Size (μm) | BET Surface Area (m²/g) |
| --- | --- | --- |
| Silica Gel (ex BDH) | 250-125 | 500 |
| Cecagel (ex British Ceca Company Limited) | 2000-1000 | 692 |
| Gasil 200 (ex Joseph Crosfield) | ∽5 | 719 |
| Sorbsil 'A' (ex Joseph Crosfield) | 250-125 | 578 |

A suitable alumina is Alcoa F1 supplied by (Alcoa of GB Ltd.).

Typically up to 0.5 millimoles/g of cation can be combined with the oxide. Since, as indicated above, the technique of ion-exchange is relatively simple, the selection of preferred inorganic oxides and the treatments to give maximum uptake of corrosion inhibiting cations can be determined by simple comparative experiments. The lower limit may be 0.01 millimoles/g but it is preferably 0.05 millimoles/g.

The corrosion inhibiting particles described above may be included in protective coatings and the present invention includes protective coatings containing the corrosion inhibiting particles. The protective coatings may be of any of the known types of protective coatings based on film forming polymers or resins, e.g. paints, varnishes and lacquers. It may, in particular, be primer paints based on epoxy resins, vinyl resins, alkyd resins, chlorinated rubbers or cyclised rubbers.

The corrosion inhibiting particles may act as a filler for the coating and may be included in amounts of up to 40% wt, based on the composition to be applied and up to 80% wt based on the dry film weight.

Having regard to the typical quantity of cations which can be combined with the oxide as discussed previously it will be seen that the coatings may contain up to 0.4 millimoles/g of the ion-exchanged cations based on the dry film weight.

Preferably the quantity of the ion-exchanged cations is at the upper end of the range, preferred amounts of particles being 30–80% wt based on the dry film weight.

When used in protective coatings the particles should be suitably small so as to remain in suspension in the composition before application and so as not to substantially affect the ease of application or the smoothness of the dry coating. Suitably, the particles are less than 25 microns in diameter.

The corrosion inhibiting particles act to release the cations into solution by ion exchange with an ion which exists in the environment in which the particles are used. Unlike coatings containing sparingly water soluble salts which act by the solubilisation of the corrosion inhibiting salts, it is the permeability to the exchanging ions rather than the permeability of water which controls the rate of release of the ion-exchanged cations according to the present invention. Thus the cations will be preferentially released from the inorganic oxide in those areas where the desired barrier properties of the coating are weakest.

The invention is illustrated by the following examples.

EXAMPLE 1

Lanthanum Exchanged Silica 40 g $La(NO_3)_3.6H_2O$ were added at ambient temperature to a slurry comprising 50 g of coarsely crushed silica sold by British Ceca Company Limited under the Trade Name "Cecagel Blanc" and 100 ml of distilled water. The pH of the slurry was initially 2.74 and fell to 2.19 on the addition of the $La(NO_3)_3.6H_2O$. A 4M solution of Na OH was added drop-wise to the slurry and the pH monitored. The pH rose steadily to 5.5 and then a response typical of rapid ion-exchange was noted, i.e. the initial rise in pH due to the addition of the Na OH solution was followed by a steady fall in pH. The addition of the Na OH solution was continued until the precipitation of $La(OH)_3$ became significant. The mixture was stirred for a further 15 minutes. The final pH was 6.5.

The exchanged silica was separated from the supernatant solution by decantation and repeatedly washed with distilled water. The product was ground with water in a ball mill for about 14 hours and then filtered, washed by re-slurrying and re-filtering and finally dried under vacuum at 80° C. for about 14 hours. Dis-aggregation of the resulting dry cake is a laboratory mill yielded a white pigment, containing 1.4% wt/wt of La (0.1 m mol/g).

EXAMPLE 2

Cerium Exchanged Silica

To a stirred slurry of 150 g Cecagel Blanc in 300 ml distilled water at ambient temperature were added 125 g $Ce(NO_3)_3.6H_2O$. The pH fell from 2.64 to 1.89. A 10M solution of NaOH was then added dropwise. A rapid exchange reaction began above pH 4. At pH 6.5 $Ce(OH)_3$ precipitate began to appear. Further NaOH was added to maintain the pH in the range 6–6.5 until the exchange slowed. The final slurry pH was 6.4.

The exchanged silica was separated and processed as described in Example 1, to yield a cream coloured pigment containing 2.6% w/w Ce (0.19 m mol $g^{-1}$).

EXAMPLE 3

Yttrium Exchanged Silica

To a stirred slurry of 100 g Cecagel Blanc in 200 ml distilled water at ambient temperatures were added 76.6 g $Y(NO_3)_3.6H_2O$. The pH fell from 2.23 to 1.75. A 5M solution of NaOH was then added dropwise. In the pH range 3.5–5 a rapid exchange response appeared, but above this the reaction slowed rapidly and at pH 6 the system was stable.

The exchanged silica was recovered and processed as described in Example 1. The resulting white pigment contained 1.0% w/w Y (0.11 m mol $g^{-1}$).

EXAMPLE 4

Silica Exchanged with a Natural Mixture of Lanthanides 75 g of finely ground Bastnasite, a naturally occurring fluorocarbonate of the lanthanides, (ex Union Molycorp) was mixed with 60 ml of concentrated sulphuric acid. When the initial reaction abated, the mixture was heated at around 200° C. for 30 mins. The mixture was then cooled and poured into 500 ml of cold distilled water with vigorous stirring. The resulting mixture was boiled for 30 minutes, allowed to cool and then filtered to remove insoluble material. Lanthanide hydroxides were precipitated from the filtrate using a sodium hydroxide solution. These hydroxides were separated by filtration and thoroughly washed with water to remove sulphate.

The filter cake was dissolved in the minimum amount of concentrated nitric acid and the solution diluted to about 200 ml with water. 100 g of Cecagel Blanc were added to the solution with vigorous stirring. A 10M solution of sodium hydroxide was then slowly added to raise the pH to 7. The typical ion-exchange response was noted. The final pH was 6.3.

The exchanged silica was recovered by filtration and repeatedly washed with distilled water. The product was ground with water in a ball mill for 16 hours and then filtered, dried and de-aggregated to yield a pigment containing 1.0% wt/wt La (0.07 mmol/g), 1.9% wt/wt Ce (0.14 mmol/g) and detectable traces of Pr, Nd, Sm and Gd.

EXAMPLE 5

Yttrium Exchanged Silica

A 6M solution of sodium hydroxide was slowly added to a stirred slurry of 100 g Cecagel Blanc in 200 ml distilled water at ambient temperature. The pH rose rapidly. A typical ion-exchange response was observed above pH 3 but the pH was maintained above 7 to obtain sufficient uptake of sodium ions. Approximately 150 ml of the sodium hydroxide solution were added over 3 hours giving a final stable pH of 8.97. The exchanged silica was recovered by filtration, washed with distilled water and dried under vacuum at 85° C. for about 16 hours. The resulting granular material contained 2% wt/wt Na (0.87 mmol/g).

An approximately 1M solution of yttrium nitrate was prepared by stirring 28 g of yttrium hydroxide in 200 ml water and adding concentrated nitric acid dropwise until the solid yttrium hydroxide just dissolved.

150 g of the sodium exchanged silica was added to the yttrium nitrate solution and the mixture stirred for 30 minutes. The yttrium exchanged silica was recovered by filtration, washed with water and then ground with water in a ball mill for about 16 hours. The product was filtered and washed and then dried under vacuum at 85° C. for about 16 hours. De-aggregation of the cake yielded a pigment which contained 2% wt/wt Y (0.22 mmol/g) and 0.6% wt/wt Na (0.26 mmol/g).

EXAMPLE 6

Lanthanum Exchanged Silica 150 g of sodium exchanged silica as prepared in Example 5 were added to a solution of 86 g of $La(NO_3)_3.6H_2O$ in 200 ml of water. The mixture was stirred for 30 minutes.

The Lanthanum exchanged silica was recovered and processed in the same manner as described in Example 5 to give a pigment containing 4% wt/wt La (0.29 mmol/g).

EXAMPLE 7

10 g of each of the cation exchanged inorganic particles prepared in Examples 1 to 3 were added to 1000 ml samples of a 3.5% wt/wt solution of Na Cl in distilled water. The solutions were continuously sparged with air to maintain oxygen saturation and to keep the particles in suspension. A weighed grit-blasted, de-greased mild steel coupon measuring about 100 mm×40 mm×2.5 mm and weighing approximately 90 g was immersed in each solution for one week. The coupons were then de-rusted with ammoniacal acetylacetone and re-weighed. The percentage weight loss of the coupon exposed to a salt solution containing corrosion inhibiting particles (X) and the percentage weight loss of a coupon exposed to a salt solution containing no corrosion inhibiting particles (Y) were used to calculate a value for the efficiency of the corrosion inhibiting particles using the formula;

$$\text{Corrosion Inhibition Efficiency} = \frac{(Y-X)}{Y} \times 100\%$$

The corrosion inhibition efficiency of each of the particles prepared in Examples 1 to 3 is given in Table 1.

TABLE 1

| Corrosion Inhibition Efficiency of Cation-exchanged Inorganic Oxide Particles | | | |
|---|---|---|---|
| Example | Cation | Inorganic Oxide | Corrosion Inhibition Efficiency |
| 1 | $La^{3+}$ | Silica | 98 |
| 2 | $Ce^{3+}$ | Silica | 97 |
| 3 | $Y^{3+}$ | Silica | 96 |

The results indicate that the particles have good corrosion inhibiting properties.

EXAMPLE 8

Paint formulations based on a Long Oil Alkyd Resin Incorporating Cation Exchanged Inorganic Oxide A series of paints based on a long oil alkyd resin was prepared containing the corrosion inhibiting particles prepared in Examples 1 to 4. The compositions of the paint formulations are given in Table 2. The paints contained metal driers and anti-skinning agents at the amounts recommended by the manufacturers. The pigment volume concentration and volume of solids for each formulation are also given in Table 2. The paints were prepared by gelling the resin with the thixotrope in a high speed disperser and then milling this with the other components in a ball mill for 16 hours.

The paints were applied to degreased, polished, mild steel panels (ex Pyrene Chemical Services Limited) measuring approximately 6 inches (152 mm) by 4 inches (101 mm) and cured for 7 days at ambient temperature. The coated panels were then scratched through to the bare metal and subjected to accelerated weathering in salt spray test ASTM B117-73 for 350 hours. The rusting of the panels was evaluated according to ASTM 610-68 which is a visual test of the specimens in which values are assigned on a scale of 0 to 10 where 10 is a good result and 0 is a bad result. The results of this evaluation are given in Table 3. The maximum cut back, i.e. the maximum spread of under film corrosion from the scratch is also given in Table 3.

A panel coated with a paint based on the same long oil alkyd resi but which did not contain a corrosion inhibitor according to the invention was also subjected to ASTM B117-73 for 350 hours and the results obtained for this panel are included in Table 3 for comparison.

The results show that each of the paints containing corrosion inhibiting particles according to the invention performed well in the accelerated weathering test and that each of the paints performed better than the alkyd paint containing no corrosion inhibitor.

TABLE 2

Paint Formulations

| Component | \multicolumn{7}{c}{Formulations (grams)} | | | | | | |
|---|---|---|---|---|---|---|---|
| | 1 | 2 | 3 | 4 | 5 | 6 | 7 |
| Long oil alkyd resin (Synolac 76W, ex Cray Valley Products Limited) | 91.52 | | | | | 57.82 | |
| Soya Lecithin (ex BOCM Silcock) | 1.32 | | | | | 0.81 | |
| Thixomen (ex ICI) | — | | | | | 0.74 | |
| Titanium dioxide (RCRZ, ex BTP Tioxide) | 20.14 | | | | | — | |
| Iron Oxide | — | | | | | 14.24 | |
| Microdol Extra (ex Norwegian Talc) | — | | | | | 11.65 | |
| Barytes (ex H. Haeffner & Company) | 50.11 | | | | | 31.55 | |
| Calcium Carbonate (Calfort-s ex John E. Sturge) | 23.69 | | | | | — | |
| Calcium Carbonate (Whiting, ex H. Haeffner) | — | | | | | 4.43 | |
| White Spirit | 43.47 | | | | | 15.0 | |
| Lanthanum exchanged silica (Example 1) | 38.36 | | | | | | |
| Carium exchanged silica (Example 2) | | 38.36 | | | 19.5 | | |
| Yttrium exchanged silica (Example 3) | | | 38.36 | | | | 19.5 |
| Mixed Lanthanides exchanged silica (Example 4) | | | | 38.36 | | | 19.5 |
| Pigment Volume Concentration (%) | 48 | | | | | 46 | |
| Volume Solids (%) | 48 | | | | | 54 | |

TABLE 3

Salt Spray Test ASTM B117-73

| Formulation | Average Coating Thickness (μm) | ASTM 610-68 Overall | ASTM 610-68 Underfilm | Maximum Cut Back (mm) |
|---|---|---|---|---|
| 1 | 43 | 8 | 7 | 5 |
| 2 | 48 | 10 | 9 | 4 |
| 3 | 49 | 9 | 8 | 10 |
| 4 | 47 | 9 | 9 | 10 |
| 5 | 69 | 10 | 9 | 2 |
| 6 | 71 | 10 | 8 | 2.5 |
| 7 | 70 | 9 | 9 | 2.5 |
| Synolac 76W based paint with no corrosion inhibitor | 73 | 8 | 4 | 25 |

EXAMPLE 9

Paint Formulations based on a Short Oil Alkyd Resin

A series of paints based on a short oil alkyd resin was prepared containing the corrosion inhibiting particles prepared in Examples 2, 4, 5 and 6. The compositions of the paint formulations are given in Table 4. The paints also contained metal driers and anti-skinning agents at the amounts recommended by the manufacturers. The pigment volume concentration and volume of solids are also given in Table 4. The paints were prepared by gelling the resin with the Thixomen in a high speed disperser and then milling this with the other components in a ball mill for about 16 hours.

The paints were applied to mild steel panels and subjected to accelerated weathering in salt spray test ASTM B117-73 for 350 hours as were the paints in Example 8. The results of this test are given in Table 5. A panel coated with a paint based on the same short oil alkyd resin but which contained no corrosion inhibitor according to the invention was also subjected to ASTM B117-73 for 350 hours and the results obtained for this panel are included in Table 5 for comparison.

The results show that each of the paints containing corrosion inhibiting particles performed well in the accelerated weathering test ASTM B117-73 and they all performed better than the short-oil alkyd resin based paint containing no corrosion inhibitor.

TABLE 4

Paint Formulations

| Component | \multicolumn{4}{c}{Formulation (grams)} | | | |
|---|---|---|---|---|
| | 8 | 9 | 10 | 11 |
| Short oil alkyd resin Synolac 9090X, Cray Valley Products Ltd | 58.14 | | | |
| Thixomen (ex ICI) | 0.65 | | | |
| Iron Oxide | 8.19 | | | |
| Microdol Extra (ex Norwegian Talc) | 7.37 | | | |
| Barytes (ex H. Haeffner) | 18.49 | | | |
| Calcium Carbonate (Whiting, ex H. Haeffner) | 7.01 | | | |
| Xylene | 20.96 | | | |
| Cerium exchanged Silica (Example 2) | 10.53 | | | |
| Mixed lanthanide exchanged silica (Example 4) | | 10.53 | | |
| Yttrium exchanged silica (Example 5) | | | 10.53 | |
| Lanthanum exchanged silica (Example 6) | | | | 10.53 |
| Pigment Volume Concentration (%) | 40 | | | |
| Volume Solids (%) | 42.5 | | | |

TABLE 5

Salt Spray Test ASTM B117-73

| Formulation | Average Coating Thickness (μm) | ASTM 610-68 Overall | ASTM 610-68 Underfilm | Maximum Cut Back (mm) |
|---|---|---|---|---|
| 8 | 58 | 10 | 8 | 0.5 |
| 9 | 56 | 10 | 9 | 0.5 |
| 10 | 50 | 10 | 9 | 0.5 |
| 11 | 53 | 10 | 9 | 0.5 |
| Synolac 9090X based paint containing no corrosion inhibitor | 37 | 7 | 7 | 8 |

We claim:

1. A corrosion inhibitor comprising particles of an inorganic oxide having cations chemically bound to the surface of the particles by ion-exchange with protons from hydroxyl groups on the said surface, the cations bound to the particles being releasable by further ion-exchange characterised in that the cations are cations of yttrium or cations of one or more metals of the Lanthanide group which group comprises metals having atomic numbers from 57 to 71 inclusive.

2. A corrosion inhibitor as claimed in claim 1 in which the inorganic oxide is silica.

3. A corrosion inhibitor as claimed in claim 1 in which the BET surface area of the inorganic oxide is greater than 100 m$^2$/g.

4. A corrosion inhibitor as claimed in claim 3 in which the BET surface area of the inorganic oxide is greater than 250 m$^2$/g.

5. A corrosion inhibitor as claimed in claim 4 in which the BET surface area of the inorganic oxide is greater than 500 m$^2$/g.

6. A corrosion inhibitor as claimed in claim 1 in which the inorganic oxide contains from 0.01 to 0.5 millimoles/g of cations.

7. A corrosion inhibitor as claimed in claim 6 in which the inorganic oxide contains from 0.05 to 0.5 millimoles/g of cations.

8. A corrosion inhibitor as claimed in claim 1 in which the particles of the inorganic oxide are less than 25 microns in diameter.

9. A method of forming corrosion inhibiting particles comprising contacting an inorganic oxide having surface hydroxyl groups with an aqueous solution containing cations of yttrium or cations of one or more metals of the lanthanide group at an initial pH in the range 3.5 to 7 which pH is sufficiently high for the protons of the hydroxyl groups to be replaced by the cations of yttrium or the lanthanide metal or metals, but which is not so high as to cause precipitation of the cation hydroxide or hydrous oxide and thereafter maintaining the pH within the range 3.5 to 7, the pH being controlled by the addition to the solution of a basic salt.

10. A method as claimed in claim 9 in which the solution is a solution of a nitrate of yttrium or one or more metals of the lanthanide group.

11. A method of forming corrosion inhibiting particles comprising contacting particles of an inorganic oxide having surface hydroxyl groups with an aqueous solution of an alkali metal salt at a pH sufficiently above 7 for the protons of the hydroxyl groups to be replaced by alkali metal cations and thereafter contacting the particles of the alkali metal exchanged inorganic oxide with a solution containing yttrium cations or cations of one or more metals of the lanthanide group so that the alkali metal cations are replaced by the cations of yttrium or the lanthanide metal or metals.

12. A method as claimed in claim 11 in which the alkali metal salt is a sodium salt.

13. A protective coating containing corrosion inhibiting particles as claimed in claim 1.

14. A protective coating containing corrosion inhibiting particles prepared by a method as claimed in either claim 9 or claim 11.

15. A protective coating as claimed in claim 13 in which the coating contains up to 80% by weight of corrosion inhibiting particles based on the dry weight of the film.

16. A protective coating as claimed in claim 15 in which the coating contains from 30 to 80% by weight of corrosion inhibiting particles based on the dry weight of the film.

17. A protective coating as claimed in claim 13 in which the coating is a paint based on epoxy resin, vinyl resin, alkyd resin, chlorinated rubber or cyclised rubber.

* * * * *